Patented May 16, 1933

1,909,787

UNITED STATES PATENT OFFICE

OSKAR PANTKE, OF COLLEGE POINT, NEW YORK, ASSIGNOR, BY MESNE ASSIGNMENTS, TO CATALIN CORPORATION OF AMERICA, OF FORDS, NEW JERSEY, A CORPORATION OF DELAWARE

LOW TEMPERATURE PHENOL-FORMALDEHYDE RESINS AND PROCESS OF MAKING SAME

No Drawing. Application filed August 28, 1930. Serial No. 478,544.

This invention relates to synthetic resin and more particularly to the synthetic resins of the phenolformaldehyde type which are condensed in the presence of a fixed alkali catalyst and to processes of producing said resin.

It is an object of the present invention to provide a clear resin of transparent character.

It is a further object of the invention to provide a synthetic resin which is relatively elastic, which has relatively great tensile strength and which is capable of being readily worked, machined and fabricated into various articles of commerce, arts and industry.

It is another object of the invention to provide a synthetic resin which is capable of being colored and tinted to simulate natural stones and minerals and products of nature.

The invention also contemplates the provision of a process of making a synthetic resin having the aforesaid properties in a relatively simple, satisfactory and practical manner.

Other objects and advantages of the invention will become apparent from the following description.

Generally speaking, my invention contemplates reacting phenol and a formaldehyde bearing substance in the presence of a strong fixed alkaline catalyst. After condensation the alkali is neutralized with an acid of lactic type. This type of acid functions not only as a neutralizer but as a resin clarifier as well. After neutralization and clarification, the resinous mass is treated with a plasticizing substance of the glycerine type. Substances of the glycerine type are dehydrators as well as plasticizers. Then the mass is dehydrated practically, completely, preferably by the application of heat in presence of a vacuum.

When substantially all of the water is removed the resinous mass is ready for casting or pouring into open molds. The cast resin is vulcanized or hardened by the application of heat at a temperature substantially below the boiling point of water (100° C.).

The following specific examples are given for illustrative purposes and for a better understanding of the invention by those skilled in the art.

*Example No. 1*

About one part of U. S. P. phenol is mixed with about 2.25 parts of 40% U. S. P. aqueous formaldehyde solution. A fixed alkaline catalyst such as c. p. potassium hydroxide is added to the aforesaid phenol-formaldehyde mixture to the extent of about 0.0375 parts. The latter mixture is heated for a period of about 2 to 3 or 4 hours at a temperature below the boiling point of water (100° C.). The temperature preferably used lies within a range extending from about 60° C. to about 75° C. or 80° C.

Water is removed from the resinous mass by the application of a vacuum which is preferably as complete as possible. Due to the evaporation of water the temperature of the resin mass falls to about 35° C. to about 40° C. This fall in temperature is compensated by the application of heat preferably in the form of indirect steam heat. In other words, the temperature of the mass first falls to a low point and then comes back to the original temperature lying within a range extending from about 55° to 65° C. After the expiration of the said period, the potassium hydroxide is neutralized with about 0.0739 parts of c. p. lactic acid. After the neutralization is complete about 0.25 parts to about 0.32 parts of glycerine are added. A temperature below the boiling point of water is maintained in the presence of a vacuum until the mass is completely dehydrated.

A convenient way for testing whether the mass is dehydrated or not is to take a sample of resin and drop it into a beaker of water which has a temperature of about 11°, 12° or 13° C. If the resin forms a globule or ball which is relatively hard when pressed between the thumb and first finger then the resin is finished.

Upon dehydration the resin mass is ready to be cast into molds. The cast resin is then hardened in a vulcanizer at a temperature substantially below the boiling point of water (100° C.). The temperature preferably used lies within a range from about 70°

C. to about 85° C. The period of time usually employed for hardening or vulcanizing the resin varies from about 100 or 175 hours to about 200 hours. After vulcanization, the resin mass is practically a substantially transparent body which is ready for use in commerce, industry and the arts.

Example No. 2

The procedure employed herein is substantially the same as in Example No. 1. In the present instance about one part of U. S. P. phenol is mixed with about 1.75 parts 40% U. S. P. formaldehyde solution to form a phenol-formaldehyde mixture. To this mixture 0.028 parts of c. p. sodium hydroxide are added. The mixture is heated for a period of about 2 to 3 hours at a temperature below the boiling point of water (100° C.). The temperature is preferably maintained within a range of about 60° C. to about 70° C. or about 82° C. or below.

Water is removed from the resinous mass by the application of a vacuum which is preferably as complete as possible. Due to the evaporation of water the temperature of the resin mass falls. This fall in temperature is compensated by the application of heat preferably in the form of indirect steam heat. In other words, the temperature of the mass first falls to a low point and then comes back to the original temperature lying within a range extending from about 55° to 65° C. After the expiration of the said period, the potassium hydroxide is neutralized with about 0.063 parts of c. p. lactic acid. After the neutralization is complete about 0.275 parts of water white glycerine are added. A temperature below the boiling point of water is maintained in the presence of a vacuum until the mass is completely dehydrated.

After the addition of lactic acid and glycerine as aforesaid, the resinous mass is dehydrated by the application of a vacuum in the presence of low heat, preferably indirect steam heat. The low heat and vacuum are continued until the mass is dehydrated as described in connection with Example No. 1. After dehydration the mass is ready to be cast or poured into open molds which are vulcanized or hardened in the same way as set forth in Example No. 1. When the resin has been completely vulcanized and hardened it is ready for use.

Example No. 3

The same procedure is employed in this example as that employed in Examples Nos. 1 and 2 but the parts of reacting materials are as follows:

1.0 parts U. S. P. phenol.
2.6 parts 30% U. S. P. aqueous formaldehyde solution.
0.033 parts of C. P. sodium hydroxide.
0.075 parts C. P. lactic acid.
0.35 parts glycerine.

In the foregoing examples, it is to be observed that about 1.25 parts by weight of phenol to about 1.0 part by weight of formaldehyde, glycerine in excess of about 0.25 parts by weight, and about 0.033 parts by weight of c. p. fixed alkali are used in the production of the new resin.

The present synthetic resin is quite clear and may be used for the production of various articles. Moreover, the resin is substantially fire retardant and is relatively inert to many oils and reagents. Furthermore, the present low temperature resin is relatively elastic and is relatively non-brittle and can be worked and fabricated by the use of methods usually employed when working with wood or the like.

It is to be observed that the present invention provides a process for producing a low temperature phenol-formaldehyde synthetic resin made by reacting phenol and formaldehyde in the proportion of about 1 part or about 1.25 parts by weight of the former to about 0.8 parts or about 1.0 part by weight of the latter. The amount of formaldehyde used depends upon the final product and the form of raw material. In other words, when formaldehyde is used as a 30% or a 40% aqueous formaldehyde solution, about 1.75 parts of the latter and about 2.6 parts of the former are used. The phenol-formaldehyde mass contains a fixed alkali catalyst which is present to an extent of about 0.033 or 0.028 or 0.030 to 0.0375 parts by weight. Of course, when the fixed alkali catalyst, such as caustic soda or caustic potash, is used in the form of a solution an increased amount of solution will have to be used depending upon the dilution or concentration of the solution as those skilled in the art will readily understand. Thus, when a 20% fixed alkali hydroxide solution is used about 0.140 to about 0.190 parts by weight may be used. Subsequently, the fixed alkali catalyst is neutralized by the addition of about 0.063 to about 0.075 parts by weight of lactic acid. If the acid is used in the form of an aqueous solution, the amount of aqueous solution must be increased depending upon the dilution or concentration of the solution. During the process or prior to final heating, about 0.25 or 0.28 to about 0.32 or 0.35 parts by weight of glycerine are added. Variations and modifications of the specific proportions herein given are within the purview of the present specification and claims as those skilled in the art will understand.

It is to be observed that the present invention produces a clear and transparent resin which is different from the resin produced by the processes set forth in my co-pending applications Serial Nos. 478,543; 478,545; and 478,546. The first of said applications produces a translucent resin; the second produces an opaque ivory colored resin resembling natural ivory; and the third produces an opaque white resin resembling marble.

Although I have set forth herein specific temperatures, concentrations, periods of time, specific substances, and specific operations, it will be observed that the use of equivalents and variations may be resorted to without departing from the spirit of the invention as defined in the appended claims.

I claim:—

1. The process of producing a low temperature phenol-formaldehyde resin which comprises reacting phenol and a substance yielding formaldehyde in the proportion of about 1.25 parts by weight of phenol to about 1.00 part by weight of formaldehyde in the presence of about 0.140 to about 0.190 parts by weight of a 20% fixed alkali hydroxide solution under non-reflux conditions, heating the said phenol-formaldehyde mass without boiling the same at a low heat substantially below about 100° C. for a period of about 2 to about 4 hours to form a resinous mass, applying a vacuum to said resinous mass after the termination of said period whereby water is evaporated and the temperature of the resinous mass tends to fall, continuing heating below about 100° C. said resinous mass to counteract the tendency of the temperature to fall, adding substantially pure lactic acid to substantially neutralize the alkali, continuing the application of said low heat below about 100° C. and vacuum, adding glycerine to said resinous mass in excess of about 0.25 parts by weight, continuing the application of said vacuum and said heat until a sample of the mass when dropped into cold water congeals to a globule having just sufficient hardness to yield slightly when squeezed between the fingers, thereafter pouring said mass into molds, and subjecting said molds to a low heat at a temperature substantially under about 100° C. for a period up to 200 hours to harden said resinous mass.

2. The process of producing a low temperature phenol-formaldehyde resin which comprises reacting about 1.25 parts by weight of phenol with aqueous formaldehyde containing about 1.00 part by weight of formaldehyde in the presence of about 0.030 parts by weight of a c. p. fixed alkali hydroxide under non-reflux conditions, heating said mass without boiling the same at a temperature of about 60° C. to about 80° C. for a period of about 2 to about 4 hours to form a resinous mass, upon the termination of the said period applying a vacuum to effect the evaporation of water, the temperature of the mass falling to a temperature of about 35° C. to about 40° C., continuing the application of heat to raise the temperature of said mass to a temperature of about 60° C. to about 80° C., adding about 0.06 parts to about 0.075 parts by weight of substantially pure lactic acid to substantially neutralize said alkali catalyst, continuing the application of said low heat and vacuum, adding c. p. water white glycerine in proportion of about 0.25 parts to about 0.35 parts by weight, continuing the application of said vacuum and heat to effect dehydration the resinous mass, discontinuing the aforesaid operation when a sample of the resinous mass, upon being dropped in water having a temperature of about 11° C. to about 13° C., congeals to a globule having just sufficient hardness to yield slightly when squeezed between the fingers, then pouring the resinous mass into molds and subjecting said molds to heat at a temperature of about 76° C. to about 82° C. for a period up to about 200 hours to harden and solidify the said resinous mass.

3. The process of producing a low temperature phenol-formaldehyde resin which comprises reacting a mass of phenol and substance yielding formaldehyde in the proportion of about 1.25 parts by weight of phenol to about 1.00 part by weight of formaldehyde in the presence of about 0.006 parts by weight of a c. p. fixed alkali catalyst under non-reflux conditions, heating the said mass without boiling the same at a low heat substantially below the boiling point of water for a period of about 2 to about 4 hours, applying a vacuum to said mass after the termination of said period whereby water is evaporated and the temperature of said mass tends to fall, continuing the application of said low heat to maintain the temperature of said mass substantially below the boiling point of water, adding c. p. lactic acid to neutralize said alkali catalyst, continuing the application of said low heat and vacuum, adding c. p. glycerine in the proportion of about 0.28 to about 0.32 parts by weight, continuing the application of said vacuum and heat to effect dehydration of said mass, discontinuing said operation when a sample of the resinous mass upon being dropped into cold water congeals to a globule having just sufficient hardness to yield slightly when squeezed between the fingers, then pouring the resinous mass into molds, and subjecting said molds to heat at a temperature of about 76° C. to about 82° C. or below for a period up to about 200 hours.

4. The process of producing a low temperature phenol-formaldehyde resin which comprises reacting a mass of phenol and substance yielding formaldehyde in the proportion of about 1.25 parts by weight phenol to about 1.0 part by weight of formaldehyde in the presence of a fixed alkali catalyst under non-reflux conditions, heating the said phenol-formaldehyde mass without boiling the same substantially at low heat under 100° C. for a period of about 2 to about 4 hours, applying a vacuum to the said mass after the termination of said period whereby water is evaporated and the temperature of mass tends to fall, continuing heating said mass substantially under 100° C. to counteract the tendency of temperature to fall, adding c. p. lactic acid to substantially neutralize said alkali catalyst, continuing the application of said low heat and vacuum, adding glycerine in excess of about 0.25 parts by weight, continuing the application of said vacuum and heat to effect dehydration of said mass until a sample of the mass when dropped into cold water congeals to a globule having just sufficient hardness to yield slightly when squeezed between the fingers, thereafter pouring said mass into molds, and subjecting said molds to a low heat at a temperature substantially under 100° C. for a period up to 200 hours to harden said resinous mass.

5. The process of producing a low temperature phenol-formaldehyde resin which comprises reacting a mass of phenol and a substance yielding formaldehyde in the proportion of about 1.25 parts by weight of phenol to about 1.0 part by weight of formaldehyde in the presence of a fixed alkali catalyst under non-reflux conditions, heating the said phenol-formaldehyde mass without boiling the same at low heat substantially below about 100° C. for a period of about 2 to about 4 hours, applying a vacuum to the said mass after the termination of said period whereby water is evaporated and the temperature of mass tends to fall, continuing heating substantially below about 100° C. said mass to counteract the tendency of temperature to fall, adding c. p. lactic acid to substantially neutralize said alkali catalyst, continuing the application of said low heat substantially below about 100° C. and vacuum, adding glycerine in proportion of about 0.25 to about 0.35 parts by weight, continuing the application of said low heat substantially below about 100° C. and vacuum and pouring the liquid resin into molds.

6. A solid low temperature synthetic resin made by reacting a mass of phenol and substance yielding formaldehyde in the proportion of about 1.25 parts by weight of phenol to about 1.0 part by weight of formaldehyde in the presence of a fixed alkali catalyst under non-reflux conditions, heating the said phenol-formaldehyde mass containing the fixed alkali catalyst without boiling the same at low heat substantially below about 100° C. for a period of about 2 to about 4 hours, applying a vacuum to the said mass whereby water is evaporated and the temperature of mass tends to fall, continuing heating said mass substantially below 100° C. to counteract the tendency of temperature to fall, adding c. p. lactic acid to substantially neutralize said alkali catalyst, continuing the application of said low heat substantially below about 100° C. and vacuum, adding glycerine in excess of about 0.25 parts by weight, continuing the application of said vacuum and heat substantially below 100° C. to effect dehydration of said mass until a sample of the mass when dropped into cold water congeals to a globule having just sufficient hardness to yield slightly when squeezed between the fingers, thereafter pouring said mass into molds, and subjecting the resinous mass in said molds to a low heat at a temperature substantially under 100° C. for a period up to 200 hours to harden said resinous mass.

7. A low temperature synthetic resin made by reacting a mass of phenol and substance yielding formaldehyde in the proportion of about 1.25 parts by weight of phenol to about 1.00 parts by weight of formaldehyde in the presence of about 0.030 parts by weight of a c. p. fixed alkali catalyst under non-reflux conditions, heating the said mass without boiling the same at a low heat substantially below the boiling point of water for a period of about 2 to about 4 hours, applying a vacuum to said mass whereby water is evaporated and the temperature of said mass tends to fall, continuing the application of heat substantially below the boiling point of water to maintain the temperature of said mass, adding c. p. lactic acid to neutralize said alkali catalyst, continuing the application of said heat substantially below the boiling point of water and vacuum, adding c. p. glycerine in the proportion of about 0.25 to about 0.35 parts by weight, continuing the application of said vacuum and said heat substantially below the boiling point of water to effect dehydration of said mass, discontinuing said operation when a sample of the resinous mass upon being dropped into cold water congeals to a globule having just sufficient hardness to yield slightly when squeezed between the fingers, then pouring the resinous mass into molds, and subjecting the resinous mass in said molds to heat at a temperature of about 76° C. to 82° C. or below for a period up to 200 hours.

8. A low temperature synthetic resin made by reacting about 1.25 parts by weight of phenol with aqueous formaldehyde containing about 1.00 part by weight of formaldehyde in the presence of about 0.030 parts by weight of c. p. fixed alkali hydroxide, heating said mass at a temperature of about 60° C. to about 80° C. for a period of about 2 to about 4 hours to form a resinous mass, applying a vacuum to assist in effecting the evaporation of water, the temperature of the mass tending to fall to a temperature of about 35° C. to about 40° C., continuing the application of heat to raise the temperature of said mass to a temperature of about 60° C. to about 80° C., adding about 0.06 parts to about .075 parts by weight of substantially pure lactic acid to substantially neutralize said alkali catalyst, continuing the application of said heat and vacuum, adding c. p. water white glycerine in proportion of about 0.25 parts to about 0.35 parts by weight concomprises reacting a mass of about 1.00 part by weight of phenol and about 1.75 parts of 40% to about 2.6 parts of 30% by weight of aqueous formaldehyde in the presence of a fixed alkali catalyst, heating the said phenol-formaldehyde mass without boiling the same at low heat substantially under 100° C. for a period of about 2 to about 4 hours under non-reflux conditions to form a resinous mass, applying a vacuum to the said mass whereby water is evaporated and the temperature of mass tends to fall, continuing heating said mass substantially under 100° C. to counteract the tendency of temperature to fall, adding c. p. lactic acid to substantially neutralize said alkali catalyst, continuing the application of said low heat and vacuum, adding about 0.25 to about 0.35 parts by weight glycerine to the mass prior to final heating, continuing the application of said low heat and vacuum, pouring the liquid resin into molds and subjecting said molds to a low heat at a temperature substantially under 100° C. to harden the said resin.

14. The process of producing a low temperature phenol-formaldehyde resin which comprises reacting about one part by weight of a phenol with about 0.7 to about 0.9 parts by weight of formaldehyde in the presence of a fixed alkali hydroxide, heating said mass without boiling the same at a temperature substantially under 100° C. under non-reflux conditions to form a resinous mass, applying a vacuum to effect the evaporation of water, the temperature of the mass tending to fall, continuing the application of heat to raise the temperature of said mass to a temperature substantially under 100° C., adding c. p. lactic acid to substantially neutralize said alkali catalyst, continuing the application of said heat substantially below 100° C. and said vacuum to effect dehydration of the liquid resinous mass, and adding about 0.25 to about 0.35 parts by weight of glycerine to the mass during the aforesaid operations.

15. A solid low temperature phenol-formaldehyde synthetic resin made by reacting phenol and a substance yielding formaldehyde in the proportion of about 1.25 parts by weight of phenol to about 1.00 part by weight of formaldehyde in the presence of a fixed alkali catalyst, heating the said phenol-formaldehyde mass at a low heat substantially under 100° C. for a period of about 2 to about 4 hours to form a resinous mass, applying a vacuum to said resinous mass whereby water is evaporated and the temperature of the resinous mass tends to fall, continuing heating said resinous mass substantially under 100° C. to counteract the tendency of the temperature to fall, adding substantially pure lactic acid to substantially neutralize the alkali catalyst, continuing the application of said low heat and vacuum, adding about 0.25 to about 0.35 parts by weight of glycerine to said resinous mass, continuing the application of said vacuum and said heat, pouring said resinous mass into molds, and subjecting said molds to a low heat at a temperature substantially under about 100° C. for a period up to 200 hours to harden said resinous mass.

16. A solid low temperature synthetic resin made by reacting about one part by weight of a phenol with about 0.7 to about 0.9 parts by weight of formaldehyde in the presence of a fixed alkali hydroxide, heating said mass without boiling the same at a temperature substantially under 100° C. under non-reflux conditions to form a resinous mass, applying a vacuum to effect the evaporation of water, the temperature of the mass tending to fall, continuing the application of heat to raise the temperature of said mass to a temperature substantially under 100° C., adding substantially pure lactic acid to substantially neutralize said alkali catalyst, continuing the application of said heat substantially below 100°C. and said vacuum to effect dehydration of the resinous mass, adding about 0.25 to about 0.35 parts by weight of glycerine to the mass during the aforesaid operations, pouring the resinous mass into molds and subjecting said molds to heat at a temperature substantially below 100° C. to harden and solidify the said resinous mass.

17. A solid low temperature synthetic resin made by reacting phenol and a substance yielding formaldehyde in the proportion of about 1.00 part by weight of phenol to about 0.80 parts by weight of formaldehyde in the presence of a fixed alkali catalyst, heating the said phenol-formaldehyde mass without boiling the same at a low heat substantially under 100° C. under non-reflux conditions to form a resinous mass, applying a vacuum to said resinous mass whereby water is evaporated and the temperature of the resinous mass tends to fall, continuing heating said resinous mass substantially under 100° C. to counteract the tendency of the temperature to fall, adding substantially pure lactic acid to substantially neutralize the alkali catalyst, continuing the application of said low heat and vacuum, adding about 0.25 to about 0.35 parts by weight of glycerine to said resinous mass, continuing the application of said vacuum and said heat, pouring said mass into molds, and subjecting the mass in said molds to a low heat at a temperature substantially under about 100° C. to harden said resinous mass.

18. A low temperature synthetic resin produced by the process set forth in claim 10 having a clear transparent straw color.

19. A solid low temperature synthetic resin produced by the process set forth in claim 12, said resin being relatively non-brittle, being capable of producing a relatively long, practically unbroken ribbon or shaving when tinuing the application of said vacuum and heat substantially below about 100° C. to effect dehydration the resinous mass, discontinuing the aforesaid operation when a sample of the resinous mass, upon being dropped in water having a temperature of about 11° C. to about 13° C., congeals to a globule having just sufficient hardness to yield slightly when squeezed between the fingers, then pouring the resinous mass into molds, and subjecting the resinous mass in said molds to heat at a temperature of about 76° C. to about 82° C. for a period up to about 200 hours to harden and solidify the said resinous mass.

9. A low temperature synthetic resin made by reacting phenol and a substance yielding formaldehyde in the proportion of about 1.25 parts by weight of phenol to about 1.00 parts by weight of formaldehyde in the presence of a fixed alkali catalyst under non-reflux conditions, heating the said phenol-formaldehyde mass at a low heat substantially below about 100° C. for a period of about 2 to about 4 hours to form a resinous mass, applying a vacuum to said resinous mass whereby water is evaporated and the temperature of the resinous mass tends to fall, continuing heating said resinous mass to counteract the tendency of the temperature to fall, adding substantially pure lactic acid to neutralize the alkali catalyst, continuing the application of said low heat and vacuum, adding glycerine to said resinous mass in excess of about 0.25 parts by weight, continuing the application of said vacuum and said heat until a sample of the mass when dropped into cold water congeals to a globule having just sufficient hardness to yield slightly when squeezed between the fingers, thereafter pouring said mass into molds, and subjecting the resinous mass in said molds to a low heat of a temperature substantially under about 100° C. for a period up to 200 hours to harden said resinous mass.

10. The process of producing a low temperature phenol-formaldehyde resin which comprises reacting about one part by weight of a phenol with about 0.7 to about 0.9 parts by weight of formaldehyde in the presence of a fixed alkali hydroxide, heating said mass without boiling the same at a temperature substantially under 100° C. under non-reflux conditions to form a resinous mass, applying a vacuum to assist in effecting the evaporation of water, the temperature of the mass tending to fall, continuing the application of heat to raise the temperature of said mass to a temperature substantially under 100° C., adding c. p. lactic acid to substantially neutralize said alkali catalyst, continuing the application of said heat substantially below 100° C. and said vacuum to effect dehydration of the resinous mass, adding glycerine in excess of about 0.25 parts by weight to the mass during the aforesaid operations, then pouring the resinous mass into molds and subecting said molds to heat at a temperature substantially below 100° C. to harden and solidify the said resinous mass.

11. The process of producing a low temperature phenol-formaldehyde resin which comprises reacting phenol and a substance yielding formaldehyde in the proportion of about 1.25 parts by weight of phenol to about 1.00 part by weight of formaldehyde in the presence of a fixed alkali catalyst, heating the said phenol-formaldehyde mass without boiling the same at a low heat substantially under 100° C. for a period of about 2 to about 4 hours under non-reflux conditions to form a resinous mass, applying a vacuum to said resinous mass whereby water is evaporated and the temperature of the resinous mass tends to fall, continuing heating said resinous mass substantially under 100° C. to counteract the tendency of the temperature to fall, adding substantially pure lactic acid to neutralize the alkali catalyst, continuing the application of said heat and said vacuum, adding about 0.25 to about 0.35 parts by weight of glycerine to said resinous mass, continuing the application of said vacuum and heat until a sample of the mass when dropped into cold water congeals to a globule having just sufficient hardness to yield slightly when squeezed between the fingers, thereafter pouring said mass into molds, and subjecting the mass in said molds to a low heat at a temperature substantially under about 100° C. to harden said resinous mass.

12. The process of producing a low temperature phenol-formaldehyde resin which comprises reacting phenol and a substance yielding formaldehyde in the proportion of about 1.00 part by weight of phenol to about 0.80 parts by weight of formaldehyde in the presence of a fixed alkali catalyst, heating the said phenol-formaldehyde mass without boiling the same at a low heat substantially under 100° C. under non-reflux conditions to form a resinous mass, applying a vacuum to said resinous mass whereby water is evaporated and the temperature of the resinous mass tends to fall, continuing heating said resinous mass substantially under 100° C. to counteract the tendency of the temperature to fall, adding c. p. lactic acid to neutralize the alkali catalyst, continuing the application of said low heat and said vacuum, adding about 0.25 to about 0.35 parts by weight of glycerine prior to final heating to said resinous mass, continuing the application of said vacuum and said heat, pouring said mass into molds, and subjecting the mass in said molds to a low heat at a temperature substantially under about 100° C. to harden said resinous mass.

13. The process of producing a low temperature phenol-formaldehyde resin which turned on a lathe, and having a clear, transparent straw color.

20. A solid low temperature synthetic resin produced by the process set forth in claim 13, said resin being relatively tough, strong and elastic and being capable of bending quite readily when submerged in hot water in the form of a small rod, and having a clear, transparent straw color.

21. The process of producing a low temperature phenol-formaldehyde resin which comprises reacting about one part by weight of a phenol with about 0.7 to about 0.9 parts by weight of formaldehyde in the presence of a fixed alkali hydroxide, heating said mass without boiling the same at a temperature substantially under 100° C. under non-reflux conditions to form a resinous mass, applying a vacuum to effect the evaporation of water, the temperature of the mass tending to fall, continuing the application of heat to raise the temperature of said mass to a temperature substantially under 100° C., adding substantially pure lactic acid to substantially neutralize said alkali catalyst, continuing the application of said heat substantially below 100° C. and said vacuum to effect dehydration of the resinous mass, adding about 0.25 to about 0.35 parts by weight of glycerine to the mass, continuing the application of said heat and said vacuum, pouring the resinous mass into molds and subjecting said molds to heat at a temperature substantially below 100° C. to harden and solidify the said resinous mass.

22. A solid low temperature synthetic resin made by reacting about one part by weight of a phenol with about 0.7 to about 0.9 parts by weight of formaldehyde in the presence of a fixed alkali hydroxide, heating said mass without boiling the same at a temperature substantially under 100° C. under non-reflux conditions to form a resinous mass, applying a vacuum to effect the evaporation of water, the temperature of the mass tending to fall, continuing the application of heat to raise the temperature of said mass to a temperature substantially under 100° C., adding substantially pure lactic acid to substantially neutralize said alkali catalyst, continuing the application of said heat substantially below 100° C. and said vacuum to effect dehydration of the resinous mass, adding about 0.25 to about 0.35 parts by weight of glycerine to the mass continuing the application of said heat and said vacuum, pouring the resinous mass into molds and subjecting said molds to heat at a temperature substantially below 100° C. to harden and solidify the said resinous mass.

In testimony whereof, I hereunto set my hand.

OSKAR PANTKE.